United States Patent [19]
Ohtani et al.

[11] Patent Number: 4,539,506
[45] Date of Patent: Sep. 3, 1985

[54] RED-EMITTING SUPERLINEAR PHOSPHOR

[75] Inventors: Hiroko Ohtani, Sagamihara, Japan; Kazuharu Toyokawa, Mahopac, N.Y.

[73] Assignee: International Business Machines Corporation, Armonk, N.Y.

[21] Appl. No.: 533,481

[22] Filed: Sep. 19, 1983

[51] Int. Cl.$^3$ .............................................. C09K 11/50
[52] U.S. Cl. ............................ 313/467; 252/301.6 S; 252/301.6 F; 428/690
[58] Field of Search ................... 252/301.6 S, 301.6 F; 313/467; 428/690

[56] References Cited
U.S. PATENT DOCUMENTS
3,130,341 4/1964 Johnson ................................ 313/467

FOREIGN PATENT DOCUMENTS
868036 2/1953 Fed. Rep. of Germany ... 252/301.6 S
955389 5/1960 United Kingdom ................ 313/467

Primary Examiner—Jack Cooper
Attorney, Agent, or Firm—Yen S. Yee; George E. Clark; Roy R. Schlemmer

[57] ABSTRACT

In a red-emitting phosphor which includes ZnSe as a host material, copper (Cu) as an activator and aluminum (Al) as a coactivator, the improvement comprising the inclusion of a small amount of cobalt (Co) to provide superlinear characteristics to said phosphor in combination with said Cu and Al. A preferred range of concentration of said Co is $10^{-6}$–$2\times10^{-5}$ g atom/mol. A specific application of said red-emitting superlinear phosphor is as a phosphor screen for a current density sensitive, single gun color CRT, when mixed with a green-emitting sublinear phosphor.

8 Claims, 2 Drawing Figures

RED-EMITTING SUPERLINEAR PHOSPHOR

FIELD OF THE INVENTION

The invention relates to a red-emitting phosphor for color cathode ray tubes (hereinafter referred to as CRT) and more particularly to a red-emitting superlinear phosphor for current-sensitive single-gun color CRT.

As a CRT capable of displaying letters and/or pictures in colors, so-called current-sensitive or current-control type single-gun color CRTs are well known. Structure of such a CRT is similar to that of an ordinal monochromatic CRT except the phosphor screen. The phosphor screen is formed by mixing phosphors differing in their emission chromaticity and in their luminance versus current density behavior. In general, a phosphor with superlinear luminance-current density characteristics and a phosphor with sublinear luminance-current density characteristics are mixed and the emission chromaticity is controlled through regulating current density of the electron beam.

FIG. 1 shows characteristics of such a current-sensitive phosphor screen. The phosphor A is with superlinear luminance-current density characteristics, and the phosphor B is with sublinear luminance-current density characteristics. At a lower current density $J_1$, the emission color of the phosphor B is dominant because luminance magnitude of the phosphor B is higher than that of the phosphor A, and vice versa the emission color of the phosphor A will be dominant at a higher current density $J_2$. Therefore, it is able to emit color continuously shifting polychromatically by controlling current density of the electron beam with mixture of a superlinear phosphor and a sublinear phosphor in different chromaticity respectively.

Because of use of a single gun and color selection through control of beam current in the same manner of luminance modulation for ordinal monochromatic CRT, the current-sensitive color CRT has such advantages as simple structure, high grade of resolution and no necessity of convergence control in comparison with a three-gun shadow-mask type color CRT, but has a disadvantage of small color gamut produceable on the other hand, too.

In the prior art there have been several trials to obtain mixture of a red-emitting phosphor with a green-emitting phosphor. However, it is not desirable to use a green-emitting phosphor as a superlinear one and a red-emitting phosphor as a sublinear one because luminosity sensitivity of human eyes is higher at green and lower at red, resulting in large luminance variation perceived by eyes with the change in current density and thus color. So, to lessen the variation in luminance by colors, it is necessary to use a red-emitting phosphor as a superlinear one and a green-emitting phosphor as a sublinear one.

However, though $Zn_2SiO_4$: Mn etc. are known as green-emitting phosphors with acceptable sublinear characteristics in the prior art, there was no known satisfactory red-emitting phosphor with superlinear characteristics.

In the paper captioned as "Current-sensitive Single-gun Color CRT" by T. E. Sisneros et al., Information Display, April, 1970, pp. 33-37, (Zn, Cd) S: Ag, Ni is given as a red-emitting phosphor with superlinear characteristics. However, as the paper indicates, (Zn, Cd) S: Ag, Ni exhibits acceptable superlinear characteristics only in the approximately intermediate region between green and reddish orange, so there was only a narrow range of chromaticity shift obtained from its mixture with a green-emitting sublinear phosphor.

SUMMARY AND OBJECTS OF THE INVENTION

Therefore, it is an object of this invention to provide a phosphor with good superlinear characteristics in the pure red color region.

DETAILED DESCRIPTION OF THE INVENTION

The invention proposs to add cobalt Co to a red-emitting phosphor which includes ZnSe as a host material, Cu as an activator, Al as a coactivator. It has been found that ZnSe: Cu, Al which has been known as a red-emitting linear phosphor of high color purity changes its luminance-current density behavior to superlinear behavior by addition of a small amount of Co while substantially maintaining its original red-emitting spectral characteristics. Therefore, it is possible to get a wide chromaticity gamut ranging from green to yellow to orange to red by mixing the phosphor with a sublinear green-emitting phosphor.

Now, preferred embodiments in accordance with the present invention are described.

The superlinear red-emitting phosphor of the invention is easily obtainable by the addition of Co in the production of the already publicly known red-emitting linear phosphor ZnSe: Cu, Al.

As is well known, ZnSe: Cu, Al can be produced, for example, as follows: ZnSe powder of high purity, say, about 99.9999%, copper sulfate (II), aluminium sulfate and a suitable crystallization promoter (flux) are mixed in a solution and dried. After drying, the mixture is fired at about 1,030° C. in a $H_2S$ atmosphere.

Concentrations of Cu and Al to be added to 1 mol of ZnSe are generally selected from the viewpoint of emission efficiency in the following relationship:

$$X \leq X' \tag{1}$$

$$10^{-4} \leq X \leq 5 \times 10^{-3} \tag{2}$$

where X is the Cu concentration (g atom/mol) and X' is the Al concentration (g atom/mol). To improve emission efficiency, the concentration of Al as a coactivator should be higher than the concentration of Cu as an activator.

ZnSe: Cu, Al has its peak emission efficiency at about $10^{-3}$ mol of Cu concentration, and it is not desirable to put Cu concentration lower than $10^{-4}$ mol or higher than $5 \times 10^{-3}$ mol because in these cases the emission efficiency drops to below 50%.

ZnSe: Cu, Al obtained in such manner exhibits red-emitting spectrum characteristics with its peak value at wave length 620 nm and half-value width of 90 nm.

To add Co in accordance with the present invention, in the above stated production of ZnSe: Cu, Al, it is enough to add a Co salt, for example, cobalt sulfate together with copper sulfate (II) and aluminium sulfate in the solution and similarly perform mixing, drying and firing treatments.

Experimental results have indicated that by addition of Co to ZnSe: Cu, Al, though no substantial change occurs in the emission spectrum characteristics, the emission efficiency rapidly drops with increase of Co concentration, and at the same time, the luminance-current density relationship changes from linear to superlinear with increase of Co concentration.

Figure 2:
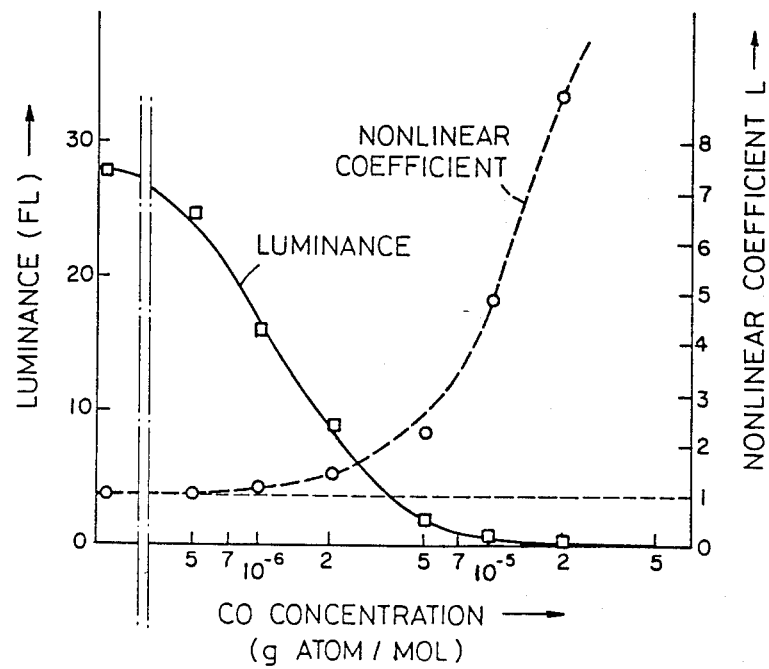
FIG. 2 depicts cobalt (Co) concentration-luminance/non-linear coefficient characteristics of the red emitting superlinear phosphor in accordance with the present invention.

FIG. 2 exhibits the dependency of luminance (FL) and nonlinear coefficient L of ZnSe: Cu, Al, Co phosphor on Co concentration with concentration of the activator Cu and the co-activator Al at $10^{-3}$ g atom/mol.

Non-linear coefficient L is generally indicated by (Bh/Jh)/(Bl/Jl) (where Bh and Bl are luminances of a phosphor at current densities Jh and Jl respectively), and Jh and Jl are respectively empirically defined as Jh=1.0$\mu$A/cm$^2$ and Jl=0.05$\mu$A/cm$^2$. L>1 means superlinear characteristics, L≃1 means linear characteristics and L<1 means sublinear characteristics. Luminances were measured under conditions of electron beam accelerating voltage 10 KV and beam current density 0.5 $\mu$A/cm$^2$.

Figure 1:
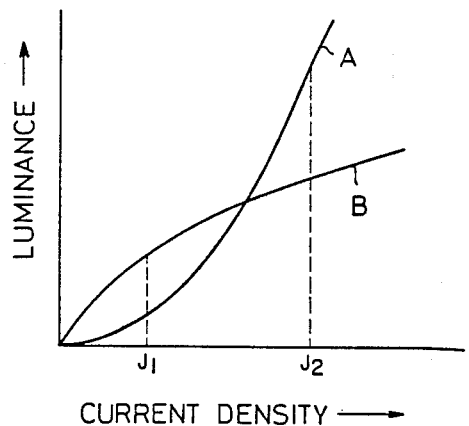
FIG. 1 depicts the superlinear and sublinear luminescence-current density characteristics, for two different phosphors

As FIG. 2 indicates, the nonlinearity coefficient L begins to exhibit apparent superlinear characteristics at Co concentration exceeding $10^{-6}$ g atom/mol. Luminance drops with increase of Co concentration, and under the condition for measurement of electron beam accelerting voltage 10 KV and beam current density 0.5$\mu$A/cm$^2$, it has approached to zero at Co concentration exceeding $10^{-5}$ g atom/mol. However, as was discussed about FIG. 1, a superlinear red-emitting phosphor is fully usable if it can keep the required degree of luminance at high current density.

According to results of tests in the range of current density 0.2-5.0$\mu$A/cm$^2$ which is usually used in current-sensitive CRT, it has been found that at higher current densities, it is possible to achieve fully acceptable luminance at Co concentration up to $2\times10^{-5}$ g atom/mol. Therefore, it is desirable to put Co concentration (Y) within the following range considering the each other conflicting nonlinearity coefficient and luminance characteristics.

$$10^{-6} \leq Y \leq 2\times10^{-5} \text{ g atom/mol} \quad (3)$$

In case that Cu concentration (X) and Al concentration (X') in the host material meet the above expressions (1) and (2), an acceptable superlinear red-emitting phosphor was obtained in the range of Co concentration represented by the above expression (3).

In the case it is desirable to modify luminance-current-density behavior or chromaticity of phosphors of the invention, some modifications are allowable.

For example, a part of Se in the host material ZnSe is replaceable by S. The more S increased, the more chromaticity shifts toward direction of orange, and it is possible to get orangeish mild red color by replacement of Se by S in the range of about 15 mol %. Further, in case of adjustment of luminance-current density behavior, it is possible to replace a part of Zn by Cd. Cd has a tendency to bring superlinear behavior near to linear characteristics. The additive quantity has its limit at 10 % because excess quantity of Cd can offset superlinear behavior.

Then, here comes explanation about case of formation of a phosphor screen for current-sensitive CRT by mixture of a superlinear red-emitting phosphor by the invention with a sublinear green-emitting phosphor.

ZnSe: Cu, Al, Co (where concentrations of Cu and Al respectively ... $10^{-4}$ g atom/mol and Co concentration ... $5\times10^{-6}$ g atom/mol) was used as a red emitting superlinear phosphor. As a green-emitting sublinear phosphor Zn$_2$SiO$_4$: Mn (where Mn concentration ... $10^{-2}$-$10^{-4}$ g atom/mol) or (Zn, Cd) S: Ag (where mol ratio of ZnS/CdS ... 45/55-65/35 and Ag concentration ... $10^{-5}$-$10^{-7}$ g atom/mol) are both acceptable, and in this case Zn$_2$SiO$_4$: Mn (where Mn concentration ... $10^{-4}$ g atom/mol) was used as a green-emitting sublinear phosphor.

The used phosphors have following characteristics respectively.

| Phosphor | CIE chromaticity coordinates (x, y) | Luminance (FL) 10 KV 0.5 $\mu$A/cm$^2$ | Non-linearity coefficient |
|---|---|---|---|
| ZnSe:Cu,Al, Co | (0.626, 0.373) | 3.7 | 2.2 |
| Zn$_2$SiO$_4$:Mn | (0.210, 0.710) | 8.0 | 0.38 |

ZnSe: Cu, Al, Co and Zn$_2$SiO$_4$: Mn were mixed in weight ratio 69:31 and then after being mixed in Potassium Silicate solution, coated on a transparent conductive glass by precipitation to from a phosphor screen. The film density was set as 4 mg/cm$^2$. The phosphor screen after drying was attached to a test demountable CRT, and working current density, CIE chromaticity coordinates (x, y), luminance and chromaticity gamut were measured at beam accelerating voltage 10 KV. The following table presents measurement results of characteristics of a prior current-sensitive phosphor screen which was formed by mixture in weight ratio 5:1 of (Zn, Cd) S: Ag, Ni as a reddish superlinear phosphor with Zn$_2$SiO$_4$: Mn and the phosphor screen which was made in the aforementioned manner in accordance with the present invention.

The chromaticity gamut was, as indicated in the paper "Evaluation of current-sensitive color CRT screens" by T. E. Sisneros, IEEE Transactions on Electron Devices, September, 1971, pp. 798-800, measure by the distance between points u and v of CIE-UCS diagram $(\Delta u^2+\Delta v^2)^{\frac{1}{2}}$.

| Screen | Current density ($\mu$A/cm$^2$) | Luminance (FL) | CIE chromaticity coordinates (x, y) | Chromaticity gamut $(\Delta u^2 + \Delta v^2)^{\frac{1}{2}}$ |
|---|---|---|---|---|
| Prior Art | 0.1-5.0 | 1.5-<50 | (0.364, 0.583)~ (0.565, 0.424) | 0.168 |
| Present Invention | 0.05-2.5 | 0.7-21.9 | (0.364, 0.591)~ (0.605, 0.386) | 0.222 |

Therefore, through use of a red-emitting superlinear phosphor of the present invention, it is possible to achieve chromaticity shift over four colors from green to yellow to orange to red with increase in current density, and chromaticity gamut was wider by about 32% than that of prior one. And it was workable at relatively low current density and luminance variation caused by chromaticity shift was lessened, too.

We claim:

1. A red-emitting phosphor which includes ZnSe as a host material, Cu as an activator and Al as a coactivator, and Co in amount sufficient to impart superlinear characteristics to said phosphor.

2. A red-emitting phosphor, as recited in claim 1, wherein the concentration of Co is $10^{-6}$-$2\times10^{-5}$ g atom/mol.

3. A red-emitting phosphor, as recited in claim 1, wherein the concentrations of Cu, Al and Co are as follows:

$$X \leq X'$$

$$10^{-4} \leq X \leq 5\times 10^{-3} \text{ g atom/mol}$$

$$10^{-6} \leq Y \leq 2\times 10^{-5} \text{ g atom/mol}$$

where, X is concentration of Cu, X' is concentration of Al, and Y is concentration of Co.

4. A red-emitting phosphor, as recited in claim 3, wherein Se is replaced by S in the range of less than 15 mol percent.

5. A red-emitting phosphor, as recited in claim 3, wherein Zn is replaced by Cd in the range of less than 10 mol percent.

6. A phosphor screen for a current-sensitive, single-gun color CRT, comprising the mixture of a red-emitting superlinear phosphor ZnSe having Cu, and Al as activator and coativator respectively and a small concentration of, Co sufficient to render said phosphor superlinear and a green-emitting sublinear phosphor selected from $Zn_2SiO_4$: Mn and (Zn, Cd)S: Ag.

7. A phosphor screen, as recited in claim 6, wherein the concentration of Co is $10^{-6}$-$2\times 10^{-5}$ g atom/mol.

8. A phosphor screen, as recited in claim 7, wherein the concentration of Mn is $10^{-2}$-$10^{-4}$ g atom/mol, the molar ratio of ZnS:CdS is 45:55 to 65:35, and the concentration of Ag is $10^{-5}$-$10^{-7}$ g atom/mol.

* * * * *

UNITED STATES PATENT AND TRADEMARK OFFICE
CERTIFICATE OF CORRECTION

PATENT NO.   :   4,539,506
DATED        :   September 3, 1985
INVENTOR(S)  :   H. Ohtani et al It is certified that error appears in the above-identified patent and that said Letters Patent is hereby corrected as shown below:

The following information should be placed after [22] in the header on page 1 of the issued patent:

FOREIGN APPLICATION PRIORITY DATA

[30]   September 28, 1982 [JP]   Japan..................57-167714

Signed and Sealed this

Eighteenth Day of November, 1986

Attest:

DONALD J. QUIGG

Attesting Officer    Commissioner of Patents and Trademarks